UNITED STATES PATENT OFFICE.

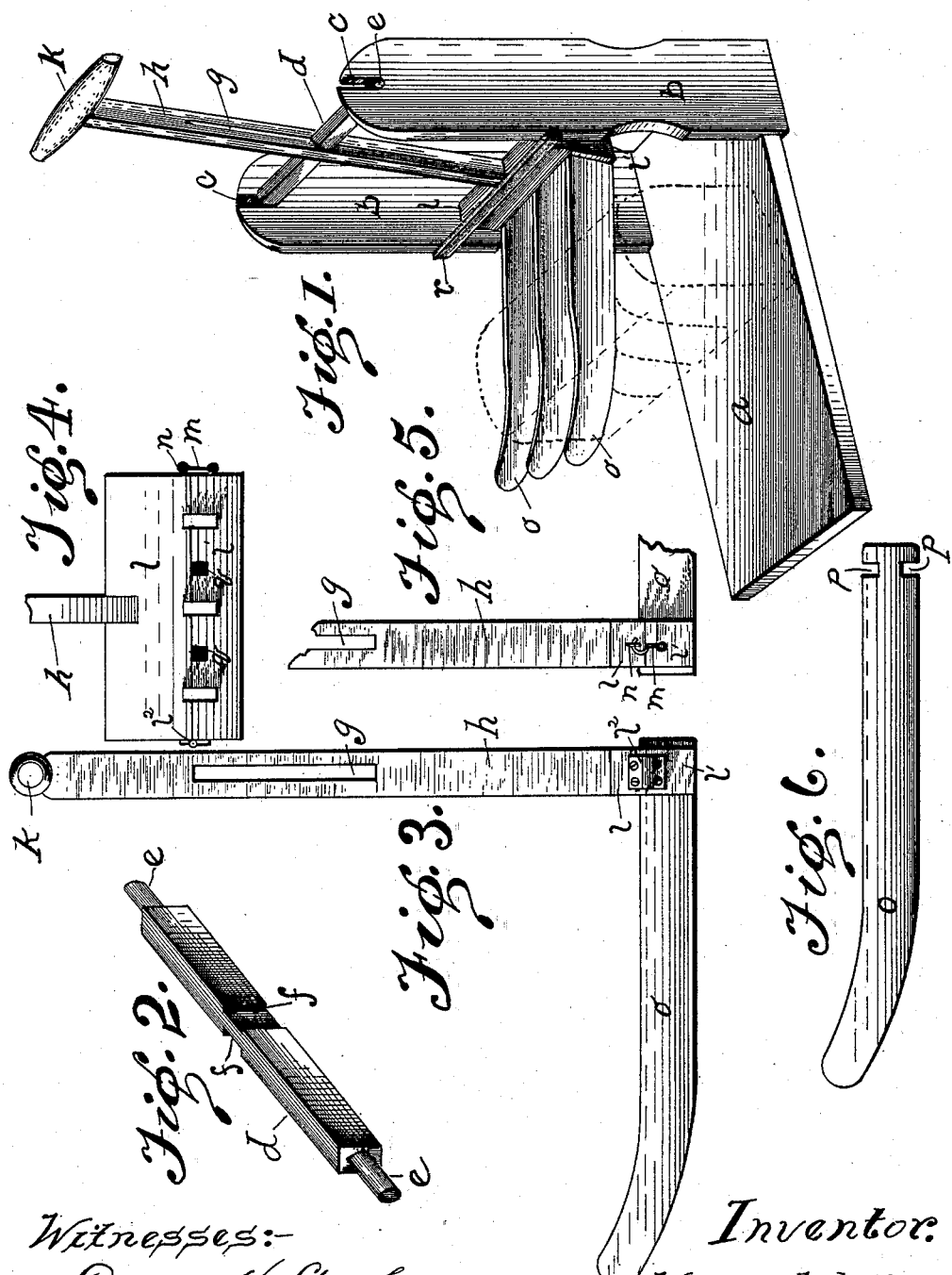

WILLIAM L. WALKER, OF ALLEGHENY, PENNSYLVANIA.

BREAD-CUTTER.

SPECIFICATION forming part of Letters Patent No. 580,743, dated April 13, 1897.

Application filed December 21, 1896. Serial No. 616,459. (No model.)

*To all whom it may concern:*

Be it known that I, WILLIAM L. WALKER, a citizen of the United States of America, residing at Allegheny, in the county of Allegheny and State of Pennsylvania, have invented certain new and useful Improvements in Bread-Cutters, of which the following is a specification, reference being had therein to the accompanying drawings.

This invention relates to certain new and useful improvements in bread-cutters, and has for its object to construct a device whereby several slices of bread may be cut from the loaf with one operation and thereby greatly facilitate this work in restaurants, hotels, and the like, for which my improvement is particularly adapted, though it may be employed for domestic use.

The invention further aims to construct a device of this nature that will permit of the knives being drawn through the loaf in such a manner as to make a clean cut, the operation being practically the same as accomplished by a hand-knife, and thus prevent the cutter from crushing the loaf in the operation of cutting.

A still further object is to construct a device of the above nature, that will be extremely simple in its construction, strong, durable, effectual in its operation, and comparatively inexpensive to manufacture.

With the above and other objects in view the invention finally consists in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1 is a perspective view of my improved bread-cutter, showing loaf of bread in dotted lines. Fig. 2 is a perspective view of the supporting-bar. Fig. 3 is a side view of the operating-lever, head-block, and knives. Fig. 4 is a front view of the head-block and a portion of the operating-lever. Fig. 5 is a side view of a portion of the operating-lever, showing a portion of the knives and means for fastening the head-block. Fig. 6 is a side view of one of the knives.

Referring now to the drawings by reference-letters, $a$ indicates the base, secured to which are the supporting-standards $b\ b$, provided in their upper ends with grooves $c\ c$ to receive the ends $e\ e$ of the supporting-bar $d$. This supporting-bar $d$ is provided at its center with cut-away portions $f f$, forming a guide to operate in the slot $g$, extending in alinement with the operating-lever $h$. The upper end of this lever $h$ carries a handle $k$ and the lower end is secured in a head-block $l$. This head-block is formed in two pieces, the lower portion $l'$ being secured at one end to the upper portion $l$ by a hinge $l^2$ and fastened at the other end by a hook $m$, engaging an eyelet $n$ in the end of the block $l$. The knives $o\ o$ are provided with cut-away portions $p\ p$, forming shoulders or heads on their end, the shank thus formed being adapted to fit in grooves $q\ q$, cut in the upper face of the head-block $l'$, and the knives firmly held in position by the head-block $l$. Stiffening-braces $r$ are secured to the standards to hold the same firm.

The operation of my improved bread-cutter will be readily apparent from the views of the same that I have shown in the drawings, the loaf of bread being placed on the base $a$ in under the knives, which are drawn across and forced through the same by the operating-lever $h$, the knives being curved to conform to the backward movement given to the same.

It will be readily observed also that the knives may be placed as close together as desired, and the width of the cutter may be increased to conform to any number of knives that it may be desired to employ.

By means of the hinged head-block the knives may be easily removed to sharpen the same, and also that various changes may be made in the details of construction without departing from the general spirit of my invention.

Having fully described my invention, what I claim as new, and desire to secure by Letters Patent, is—

1. In a bread-cutter, a base-board supporting rigid upright standards, having grooves in the upper part thereof to receive a supporting-bar, a grooved operating-lever, embracing the supporting-bar, said operating-lever carrying a sectional head-block, hinged together, one section provided with grooves to receive knives, substantially as shown and described.

2. In a bread-cutter, a base, supporting-standards secured thereto, a supporting-bar, carried by said standards, a slotted lever engaging said supporting-bar, a head-block carried by said lever, said head-block formed in two portions hinged together, the lower portion being provided with grooves to receive the knives, substantially as shown and described.

In testimony whereof I affix my signature in presence of two witnesses.

WILLIAM L. WALKER.

Witnesses:
A. M. WILSON,
GEO. B. PARKER.